United States Patent [19]
Ruvolo

[11] Patent Number: 5,928,363
[45] Date of Patent: Jul. 27, 1999

[54] METHOD AND MEANS FOR PREVENTING UNAUTHORIZED RESUMPTION OF SUSPENDED AUTHENTICATED INTERNET SESSIONS USING LOCKING AND TRAPPING MEASURES

[75] Inventor: Joann Ruvolo, San Jose, Calif.

[73] Assignee: International Business Machines Corporation, Armonk, N.Y.

[21] Appl. No.: 08/920,612

[22] Filed: Aug. 27, 1997

[51] Int. Cl.[6] .................................................. G06F 12/14
[52] U.S. Cl. ............................................. 713/201; 380/25
[58] Field of Search ............................ 395/187.01, 186, 395/200.3, 188.01; 380/23, 25

[56] References Cited

U.S. PATENT DOCUMENTS

| | | | |
|---|---|---|---|
| 5,293,424 | 3/1994 | Holtey et al. ............................. | 380/23 |
| 5,572,643 | 11/1996 | Judson .................................... | 395/793 |
| 5,715,464 | 2/1998 | Crump et al. ........................... | 395/750 |
| 5,740,361 | 4/1998 | Brown .................................. | 395/187.01 |
| 5,758,174 | 5/1998 | Crump et al. ....................... | 395/750.05 |
| 5,771,291 | 6/1998 | Newton et al. ............................ | 380/25 |
| 5,835,724 | 11/1998 | Smith ................................. | 395/200.57 |

OTHER PUBLICATIONS

Tanenbaum, "Computer Networks", 2nd Ed., Prentice–Hall, Inc., 1988, pp. 35–42.

*Primary Examiner*—Hassan Kizou
*Assistant Examiner*—Omar A. Omar
*Attorney, Agent, or Firm*—R. Bruce Brodie

[57] ABSTRACT

A method in which unauthorized persons can be excluded from accessing an HTTP-compliant, server-based application through a client processor when the session is suspended. The method requires that authenticated access is initially bound to the application and client reauthentication by the application is required in order to resume. For persistent unauthorized users, the client processor is bound to a substituted logical partition at the server that emulates a session, notifies security, and logs the activity as evidence.

10 Claims, 7 Drawing Sheets

CLIENT/SERVER INTERNET (WEB)

SYNTACTICAL ELEMENTS OF AN HTML FORMATTED DOCUMENT
SENT BY SERVERS AND BROWSERS UNDER HTTP PROTOCOL

FIG. 3

HTML CODED AND FORMATTED DOCUMENT FROM SERVER
WITH EMBEDDED USERID AND PASSWORD LINK

FIG. 4A

CLIENT PROCESSOR SCREEN WITH HTML-CODED DOCUMENT
WITH LINK TO END OR SUSPEND SESSION

FIG. 4B

CLIENT PROCESSOR SCREEN WITH AUTHENTICATION
REQUIRED FOR SESSION START

CONTROL FLOW FOR RESUMPTION OF SUSPENDED SESSION AND BINDING AN UNAUTHORIZED USER TO A SECURE BUT SUBSTITUTE SERVER PARTITION

METHOD AND MEANS FOR PREVENTING UNAUTHORIZED RESUMPTION OF SUSPENDED AUTHENTICATED INTERNET SESSIONS USING LOCKING AND TRAPPING MEASURES

FIELD OF THE INVENTION

This invention relates to client and server processor security during authenticated Internet sessions, and more particularly to minimizing adverse client processor use in the event of session suspension or pause using either locking or trapping measures, the sessions running under HTTP and TCP/IP-like protocols.

DESCRIPTION OF RELATED ART

The Internet is an information communication and processing environment replete with its own complexity and vocabulary. The following paragraphs are directed to briefly summarizing the nature of a client server network of processors communicating over a functionally layered architecture and directed to a discussion of several security issues.

The Internet as a Layered Communications Architecture

Tanenbaum, "Computer Networks", 2nd Edition, Prentice-Hall, Inc., 1989, pages 35–42, describes the Internet as a high-speed, multimode, store and forward network of client and server node/processors. He points out that the network architecture stems from several sources, including the U.S. Defense Department's Advanced Research Projects Agency (ARPA), UseNet sponsored by Bell Labs, CSNet, etc. The Internet architecture is layered and is related to the open system interconnection (OSI) model.

A layered communications architecture presupposes that a message or information sequence originates at a top layer of functions or services. As the message passes from the top or applications/presentation down through the session/transport layer to an ultimate physical layer, the message is processed by the requisite layer in support of its preceding layer. The processing may be to add route, error protection, or security information. When it reaches the physical layer, it enters the communications medium.

When the message reaches its destination, it is processes in inverse order by each of the counterpart layers until it reaches the top or target application. Both the sending node and the receiving node execute a cycle or ordered processes that are peers and occur in inverse order. Thus, sending a message involves processes a1, a2, a3, . . . aN, while receiving the message would cause execution of processes bN, . . . , b3, b2, b1. In this regard, (a1, b1), (a2, b2) . . . (aN, bN) would be considered as peer processes although being invoked on different nodes.

The previously mentioned OSI model involves seven layers. These start with an applications layer and end with a physical layer. In contrast, the Internet uses a suite of protocols, namely, HyperText Transmission Protocol (HTTP) and the Transport Control Protocol/Internet Protocol (TCP/IP). These correspond to only two or three of the seven OSI layers, especially the OSI applications and the transport/session layers.

TCP/IP and the Internet

The Internet is a networked collection of clients and servers. In this regard, a client and server model is one in which a process executing at one site or node sends a request message to a process at a second site or node and awaits a response.

The previously mentioned TCP/IP suite of protocols provides the floor or foundation upon which the HTTP runs.

TCP/IP itself is composed of layers. The IP layer moves packets of data among client and server nodes. The IP forwards each packet based on a four-byte destination address (the IP number). The Internet authorities assign ranges of numbers to different organizations. The organizations assign groups of their numbers to departments. IP operates on gateway machines that move data from department to organization to region and then around the world.

On the other hand, the TCP component verifies the correct delivery of data from a client to a server. Data can be lost in the intermediate network. TCP adds support to detect errors or lost data and to trigger retransmission until the data is correctly and completely received. Lastly, the term "sockets" denotes a package of subroutines that provide access to TCP/IP on most systems.

Clients and Servers

A client is a process with one or more resident facilities, such as a browser. The processor and browser access the Internet, navigate to one or more addressable servers, request access to a server processor, and negotiate an information exchange.

A server is an Internet-addressable logical facility having one or more structured information assets for dissemination, update, or exchange in the event that an accessing client processor satisfies one or more logical and security conditions. The data accessing and exchange is executed at an applications execution level at both client and server processors. The interaction between clients and servers occurs exclusively by messages.

In such networks, messages are treated as partially interpretable strings by the particular layer that is instantaneously processing a given string. However, the actual meaning of the messages and how they should be disseminated, updated, or exchanged are interpreted at the applications layer. In contrast, layers such as TCP/IP process the information objects largely as uninterpreted strings.

HTTP, Web Browsers, HTML, and Security

For purposes of this invention, the Internet is physically seen as a collection of networks and gateways that use the TCP/IP and HTTP suite of protocols. The networks and gateways couple pluralities of processors. The processors are operative in client or server roles, or both. Relatedly, the previously mentioned HTTP is an application-level protocol. In controls the distributed, collaborative, and hypermedia aspects of the network.

The version of HTTP references in this specification is described in the HTTP/1.1 protocol specification dated January 1997. This was published as an Internet Official Protocol Standard of the Internet Engineering Task Force (IETF). HTTP has been in use by the World Wide Web global information initiative since 1990. It should be appreciated that HTTP messages consist of either requests from client to server or responses from server to client. HTTP interacts at the client processor via a client-resident software construct termed a "browser". The browser provides an interface, a local cache, and a set of processes for accessing the Internet, navigating over the myriad sites, communicating with a selected site including E-mail, error detection and correction, and security facilities. Relatedly, Netscape® Communicator 4.01 ©1994–1997 Netscape Communications Corporation, and the Microsoft® Internet Explorer Version 3.02, ©1995–1996 by the Microsoft Corporation, are among the commercially available browsers.

Client browsers and server applications use HyperText Markup Language (HTML) as a language syntax for defining the structure of documents and messages. HTML is described by Vivian Neou, "HTML CD—An Internet Publishing Toolkit", Prentice-Hall, Inc., 1996.

A defining characteristic of HTML-encoded documents is that they contain links or pointers to other parts of the same document or to other documents. This permits user document and process involvement in a nonlinear sequence. In this regard, the client browser and server applications interpret the syntax for control, error, and security purposes. At the client processor, the browser interprets the document or message either locally generated or received from the server. In this specification, the term "link" means a pointer in a hypertext document that points to another location or to another document. The term "link" is also used generically to connote any artifact in a hypertext document at a client interface which, upon activation, causes a message to be sent to the counterpart server application to invoke some action or change of logical or information state in the application.

It should be noted that HTTP provides a simple challenge-response authentication mechanism between a browser-driven client processor and an HTTP-compliant server. The authentication mechanism is used by a server to challenge a client request and by a client to provide authentication information. The authentication process is based on the model that the client agent must authenticate itself with a client ID and a password for each realm. A realm is a logical construct in the nature of a logical partition, the failure or success of access to which is independent of other realms. The realm value should be considered an opaque string that can only be compared to equality with other realms on that server. The server will service the request only if it can validate the client ID and password for the protection space.

Sessions, Setups, and Pauses

The physical and time connection between a client and a server may be of variable duration and comprise several stages or transactions, and is termed a "session". Typically, a server capable of processing several clients must operate as a multitasking machine. This means that the server operating system must assign significant instruction execution overhead to both setting up as well as taking down each client server session. Illustratively, task control blocks must be creased and populated, and resource queues allocated, updated, and managed. This occurs each time that a session is established.

Where sessions are long, the client from time to time may wish to pause. Given the prohibitive overhead economics of reestablishing sessions, the use of suspension/resume constructs is an alternative. These constructs save the client/server session state, including resource priorities, at the pause and resume when the pause terminates. Any background processes at the server related to the session can continue unabated.

Unfortunately, the current HTTP protocol and browser security structure provides for authenticated access only as part of initially establishing a session. In the event of a suspension or activity pause by the client, short of terminating or aborting the session, any third party can resume the authenticated session. More particularly, when a client or browser initially "logs on" to a security-protected server/application, the server application compares the client/browser-supplied identification (ID) and password (PW) with a list of authorized client IDs and PWs prestored at the server or with the application. Each communication involves the browser sending an addressed message. The messages are sent as a series of name value pairs to the server. Both the HTTP-compliant client processor and server treat the messages as addressed but uninterpreted strings. However, the application interprets the string as an HTML document. The application responsively will encode a reply and send it through the server to the client where the browser will interpret it as an HTML document and display it on the client interface.

SUMMARY OF THE INVENTION

It is accordingly an object of this invention to devise a method and means for minimizing adverse use of a client processor in an authenticated session with an Internet server running under HTTP and TCP/IP-like protocols in the event of client-initiated session suspension or pause.

It is a related object that the method and means of this invention treat both a one-time unauthorized user and a persistent adverse user providing a proportional security response.

It is still another object that the invention will not interfere with other concurrent sessions between a client-based browser and the Internet server.

It is yet another and related object that the invention will ascertain whether an unauthorized user is persistent and engage the user so as to assist his or her identification, apprehension, and to provide evidence of the access attempt in the form of an audit trail.

The critical observation is that an authorized client user causes an application to require "reauthentication" upon resumption of a suspended session. By requiring reauthentication upon resumption of a suspended session, the user must supply an ID and PW to the application and server. The application then compares the supplied ID and PW to the authorized list entries and resumes the session with the client comparison equality. This distinguishes over prior art Internet protocols, such as FTP and Telnet. The latter protocols required a client ID and password as part of an initial log-on process independent of the application executing on a server.

In this invention, a client initially logs on to an application if the client ID and PW match a prestored list of authorized persons. Also, the authentication bound to the application and reauthentication required to resume a suspended application distinguishes over HTTP. The latter does not require a client ID or password. Rather, each client browser request is treated as a single entity. The reauthorization requirement excludes the occasional or casual adverse user of the client processor from entry upon a suspended session.

Where the adverse user is persistent, there is a likelihood that repeated entry of passwords might gain session entry. Thus, it is another aspect of this invention to bind the client processor controlled by a persistent adverse user to a substitute logical partition within the server and communicate as if access to the desired application had been gained. Concurrently, the server invokes security modules providing appropriate alerts and even logging. This should assist in the physical apprehension of the persistent adverse user, as well as providing an evidentiary trail.

More particularly, the foregoing objects are believed satisfied by a method and means for resuming suspended session and trapping unauthorized users in a network connecting a client to at least one server in a client-initiated session. The client processor includes an interface for displaying a first hypertext document embedded with a link. The method of the invention includes a client establishing a first session with an application executing on the server using a challenge-response authentication step defined over a server-stored authorized list. The application is constrained such that when it is suspended, it resumes only upon reauthentication. Next, the first session between the client and server is suspended at client initiation. Subsequently, a party at the client interface opportunistically actuates an authorization link. This occurs when the client sends a hypertext document with the link and an authenticating token to the server.

The server and application will resume the session with the client only if the authenticating token compares equal to a client on the server-stored authorized list. In the event of noncomparison, the server and application will communicate a retry request to the client. This process is designed to be repeated a predetermined number of times.

If a user persists more than this threshold, then the server binds the client to a substitute logical partition and interface within the server. Also, the server causes the substitute interface to respond to messages from the client in a customary manner lulling the persistent user into an extended session. Concurrently, security agencies, such as the police, are notified and a log record or audit trail is made of the communications for use as evidence.

DESCRIPTION OF THE PREFERRED EMBODIMENT

As previously mentioned, the invention utilizes Hypertext Markup Language (HTML) and Hypertext Transfer Protocol's (HTTP) basic security mechanism. HTML and HTTP are utilized together to provide authentication for Internet (Web) applications.

For purposes of completeness, HTTP is an application-level protocol for distributed, collaborative, hypermedia information systems. It is a generic, stateless, object-oriented protocol which can be used for many tasks, such as name servers and distributed object management systems, through extension of its request methods. A feature of HTTP is the typing and negotiation of data representation, allowing systems to be built independently of the data being transferred. HTTP has been in use by the World Wide Web global information initiative since 1990. This specification defines the protocol referred to as "HTTP/1.1".

Similarly, the functions of browsers and server software, exemplars of HTML-coded documents, and the use of links and similar HTTP protocol constructs are described in Judson, U.S. Pat. No. 5,572,643, "Web Browser with Dynamic Display of Information Objects During Linking", issued Nov. 5, 1996. The Judson patent description is hereby incorporated by reference.

Figure 1:
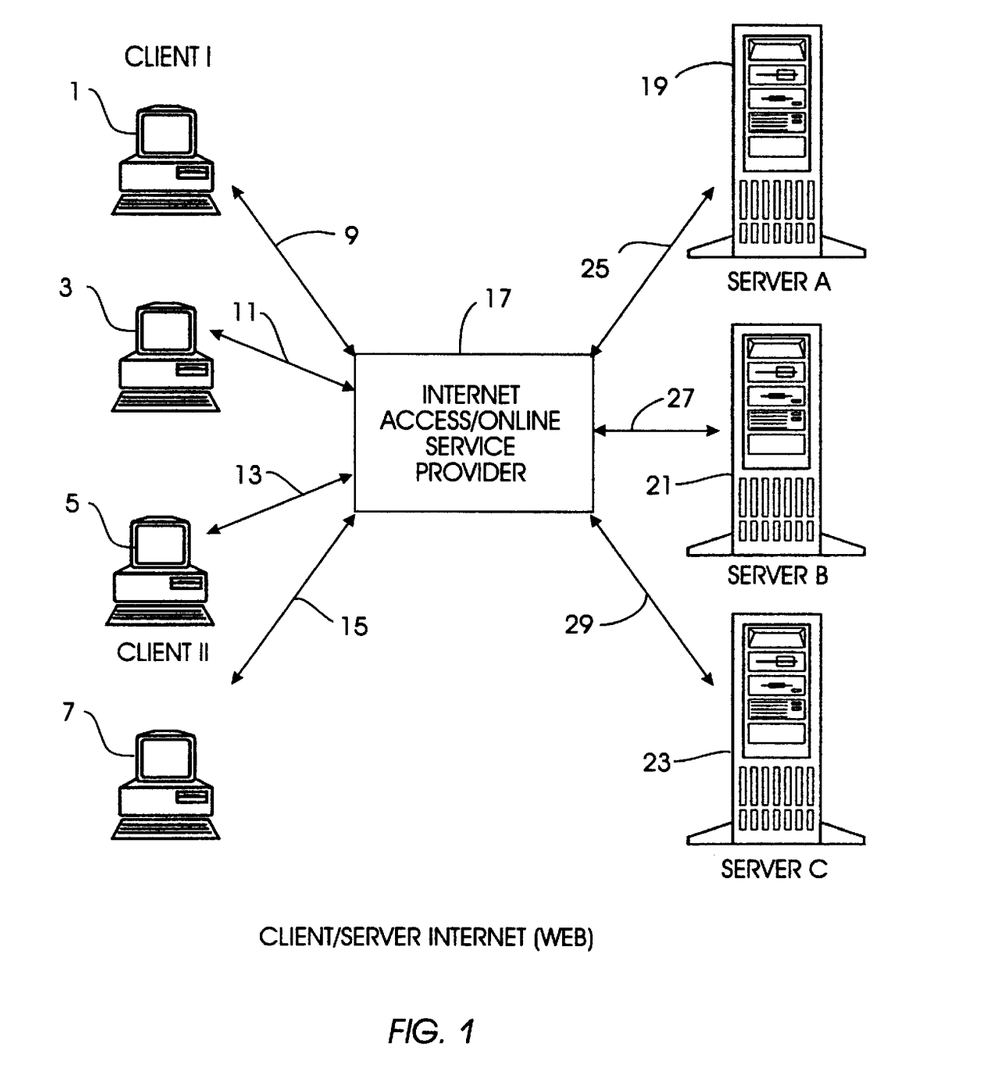
FIG. 1 depicts an Internet-type client/server communication subsystem.

Referring now to FIG. 1, there is depicted an Internet-type client/server communication subsystem. A plurality of client processors (termed "clients") 1, 3, 5, 7 opportunistically couple one or more of a plurality of HTML document servers 19, 21, 23 over an Internet access service provider. It should be appreciated that each client and each server can establish and maintain concurrent "sessions" or dialogs with a plurality of the opposite number. That is, client I could interact with servers A and B, while client II could be in session with servers B and C. The pages or documents and the addressing defining the addresses and paths are maintained in pushdown stack-type caches at the respective clients. Each time the client wishes to engage the server, a new communication must be sent. The cache storage assists fast browser retrieval and processing. Some applications executing at servers will maintain task control blocks and a transaction memory, at least for purposes of a session. This is of particular importance in financial and commercial transactions where information security and user authorization and authentication are pertinent. Thus, sessions can cover many transactions and be of long duration. The need for suspending or pausing in the session at an intermediate point avoids having to reset the entire matter and release resources that otherwise may be processing information in the session background.

Figure 2:
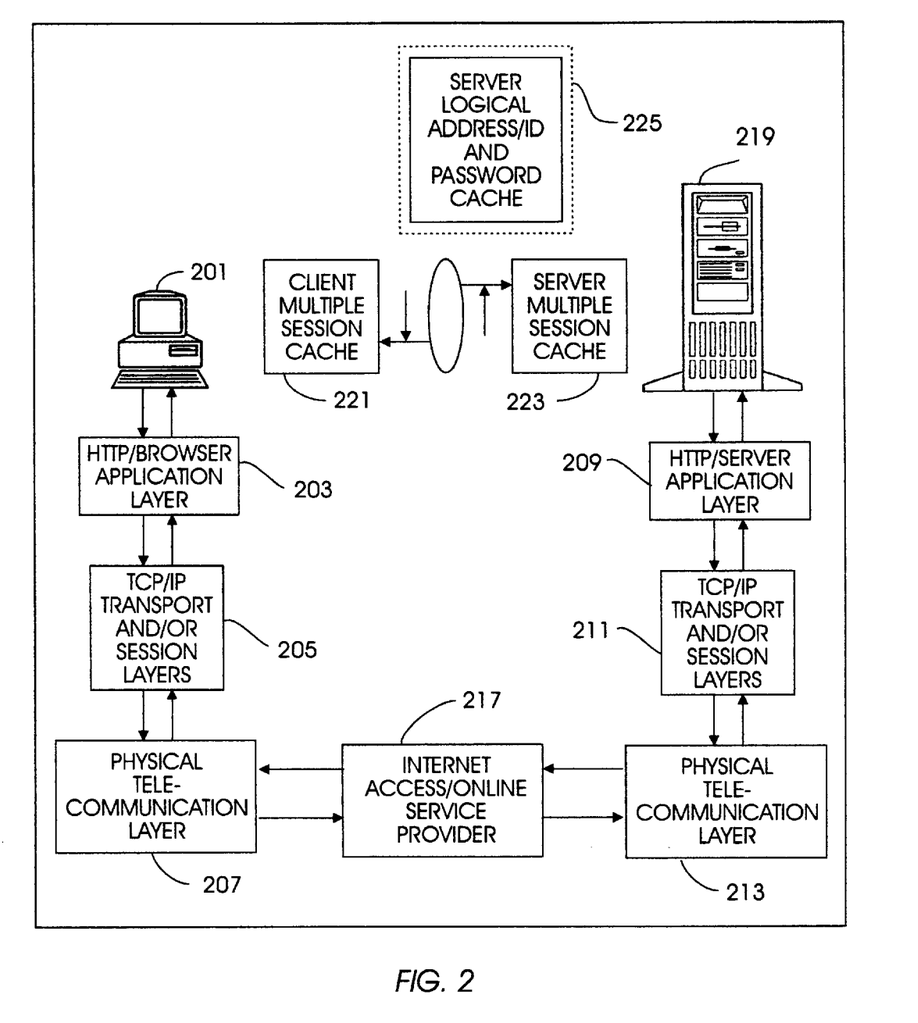
FIG. 2 sets forth the layered attributes of establishing one or more sessions between client and server processors.

Referring now to FIG. 2, there is set forth the layered attributes of establishing one or more sessions between client and server processors. In this figures, a client 201 is coupled to a server 209 over a layered bilateral functional communications path. In the client-server direction, a browser-composed, HTML-formatted document executes at an ISO application layer 203, and a signal path connection and session between the client 201 and the server 209 is established by the TCP/IP protocols executing at an ISO transport and session layers 205. The media connection is processed at the ISO telecommunications layer 207. In this regard, each layer functionally advances the document, moving from the client to the server. This is implemented usually by the browser and a modem at the client establishing a telephone link to an Internet service provider 217. The provider in turn couples the Web site server and invokes the inverse layered process through transport and session layers 211, and a server counterpart to the browser at the application layer 209.

The server 209 preferably has an operating system having a multiprogramming, multitasking capability and significant caching capacity. The caching capacity would include a larger session server cache 223 and a failure-independent nonvolatile cache 225 or disk for storing logical addresses, identities, and passwords. While the relationship between the client and server session caches 221 and 223 may approximate coupling two statistical multiplexors, nevertheless authenticated sessions represent significant exposure.

The main emphasis of the prior art utilization of authenticated sessions focus on session initiation and termination. That is, a session is started with a client logging on, and is typically ended either upon a client logging off or via a server revocation. By coupling the authentication with a client session invocation or "logon", the scope of the client authentication extends for all the applications on the logged-on server or associated with the logged-on client. As such, logging off terminates all the authenticated sessions for that user. Therefore, the first requirement is that authentication be on an application basis and that the client have control. In this regard, the client authenticates himself to a server application in response to a prompt from the application. The client can then end this authenticated session when appropriate. The ending of this session does not affect any other sessions the client has, nor does it affect the application. It is selective as far as the application and timing go. Control lies with the client and termination is within his exclusive province.

Figure 3:
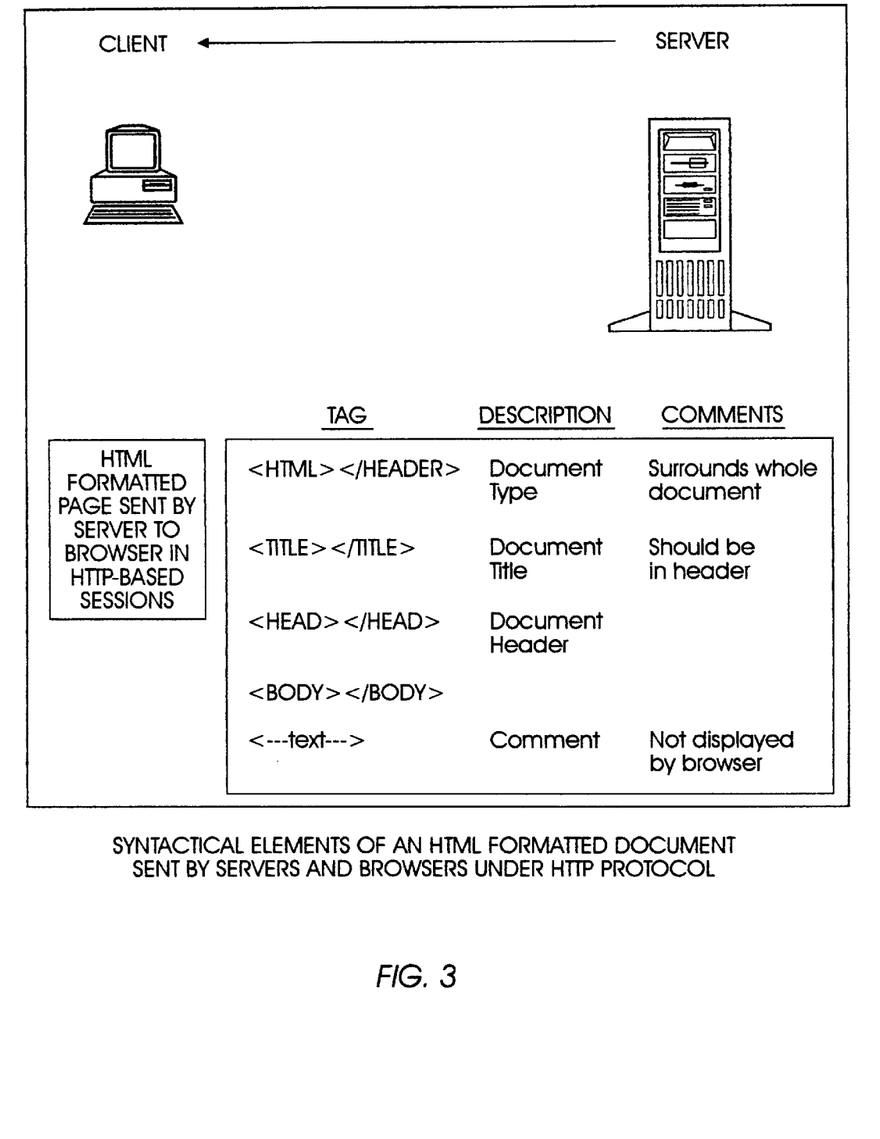
FIG. 3 shows some syntactic attributes of the HTML-organized documents passed between client browsers and servers under HTTP protocols.

Referring now to FIG. 3, there is shown some syntactic attributes of the HTML-organized documents passed between client browsers and servers under HTTP protocols. Logic in the client-resident browser software, in the Internet service provider, and in the server operating system interprets selective ones of the HTML "tags" or control codes. In such Internet arrangements as the World Wide Web (WWW), a browser always initiates a conversation with a Web server. This happens every time a user at a client processor clicks on a hyperlink in an HTML document or opens a new Uniform Resource Locator (URL). From the URL, the browser can determine which Web server to talk to. This is where the conversation begins.

The browser asks the server for the document the client user requested and also supplies some additional attributes about the request. This is the request. The most important part of the request is the document that is being requested. This takes the form of a URL path. The Web server accepts the conversation from the browser. Part of this is receiving the URL path. The server then decides what is being requested and how to handle the request. If the document and its HTML tags are in order, the server sends back to the browser some attributes about what is being served, and then the server sends back the content of the document. Both sides then end the conversation. Thus, if a browser needed to get several documents from the same server, the browser would initiate a separate request for each document.

Figure 4A:
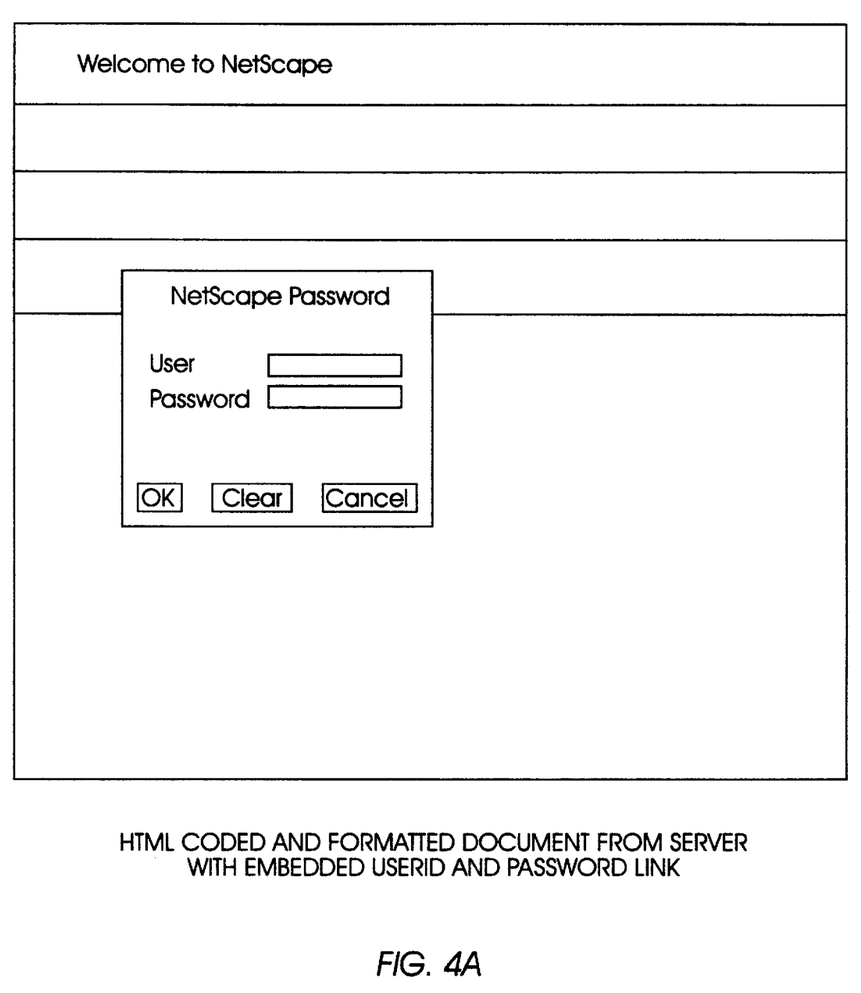
FIGS. 4A–4C illustrate HTML documents as they appear at the client processor screen used in establishing an authenticated session, suspension, and reauthentication requirement.
Figure 4B:
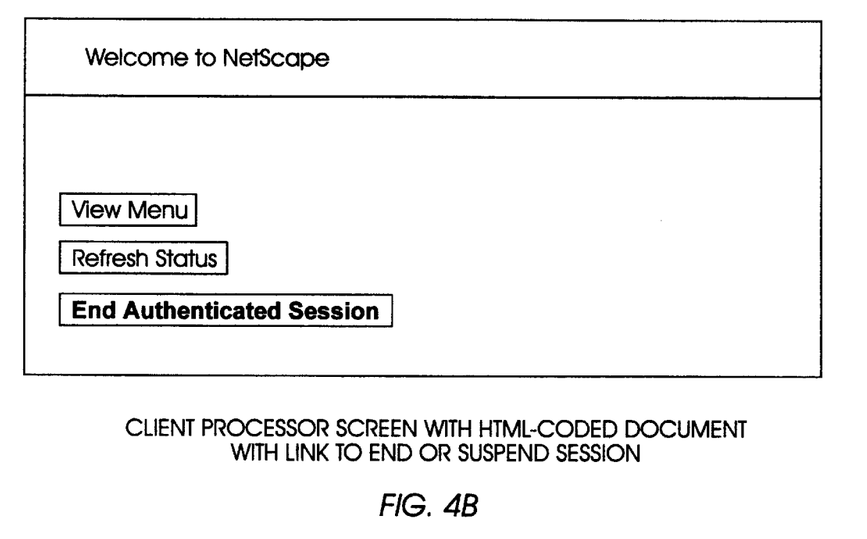
Figure 4C:
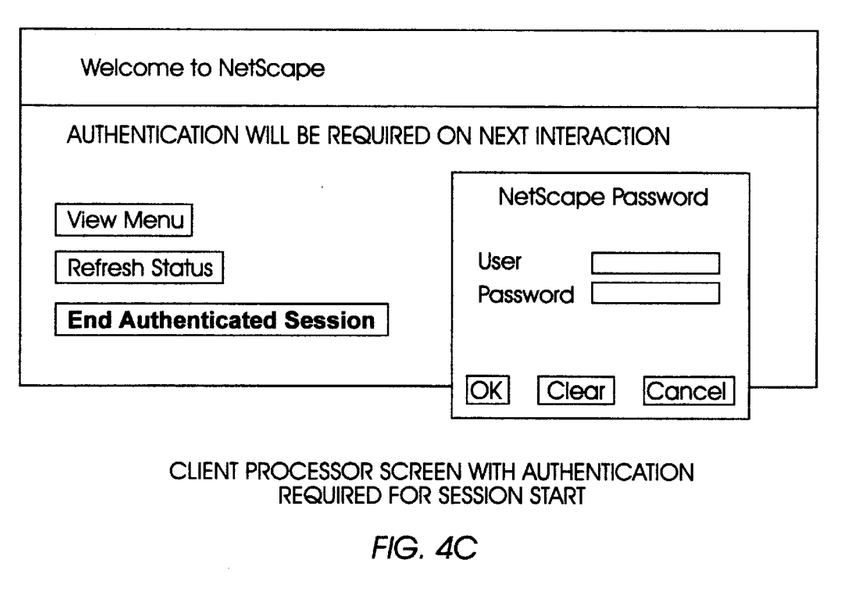
Figure 5A:
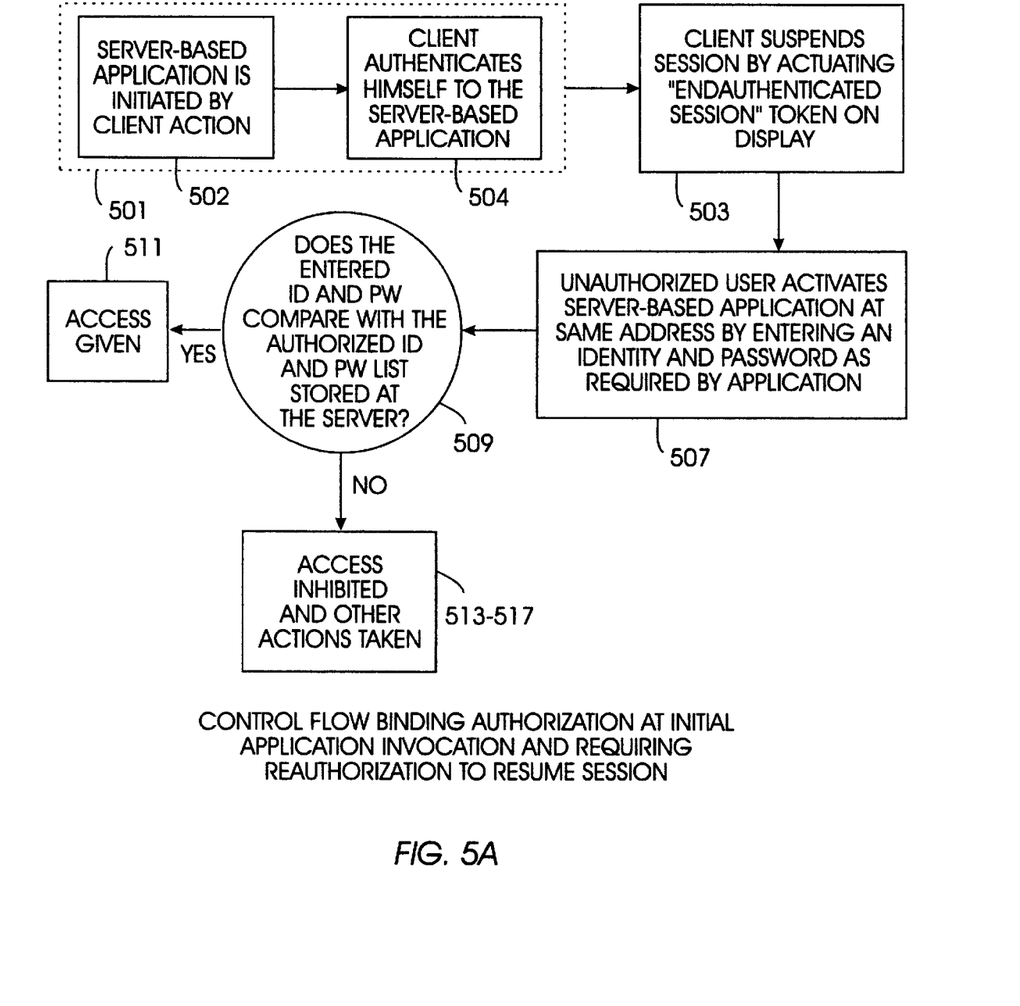
FIG. 5A depicts the control flow binding authentication of a client to the application and requiring reauthentication in order to resume a session with the server-based application.

Referring now to FIG. 5A, when take together with FIGS. 4A–4C, there is shown the control flow in which the client invokes an application from a server in step 502 and the server responds. This is depicted in FIG. 4A by sending an HTML-formatted document with an embedded user ID and password link. This link is used to establish an authenticated session with the application in step 504. In this regard, the user completes the authentication link by entering his identity and a password, then returning it to the server when actuating the OK button. The user ID and password are entered into a security cache under the control of the application. This means that it can only be changed under application control at the server.

At an opportunistic time subsequent, the user desires to suspend or pause the session. This is done in step 503 and is implemented in a hypertext document as illustrated in FIG. 4B. This document is coded with several functional links. In the method of this invention, the session pause or suspension is invoked when a user activates the "End Authenticated Session" link in step 503. There are several ways known in the art to control the duration of a suspended session, such as with a time-out monitor. However, since it is desired that the user at the client processor pace the session, the pause remains in place until terminated by the user. In order to advise the sophisticated user that reauthentication is required in order to resume the session, a document generated by the server and application in response to the pause can include the information as is set out in FIG. 4C. Also, the document can include an authentication link.

Referring still again to FIG. 4C, the "End Authenticated Session" link and client screen icon can be expressed in HTML syntax as:

```
conn <<"<input type=submit"         <<endl
conn <<"    name=session_op"        <<endlconn <<"
value=" <<"End Authenticated Session"   <<endl
conn <<">"                          <<endl
```

Referring again to FIG. 5A, when an adverse user in step 507 activates the authentication link with a user ID and password other than the original one, the server and application will comparison test the original and new tokens in step 509 and reject the request as in steps 513–517. On the other hand, if the tokens match, then the user is given access to the application and the session is resumed in step 511.

One implementation of the "test and resume" structure of steps in FIG. 5A is for the application at the server to maintain an "application control block" for each authorized user ID. When the server application receives the "End Authenticated Session" name/value pair from the client browser, it obtains the application control block associated with the user name or ID and sets a "Force Reauthentication" control bit. On each subsequent request from the client processor and user ID, the application obtains the control block and ascertains whether the reauthentication control bit is set. If the control bit is set, then the attempted authorization fails and forces the user to enter an ID and password which is then remitted to the server and application. Only where the ID and password match will the application turn the control bit off. Of course, security tokens other than ID names and passwords can be used.

Figure 5B:
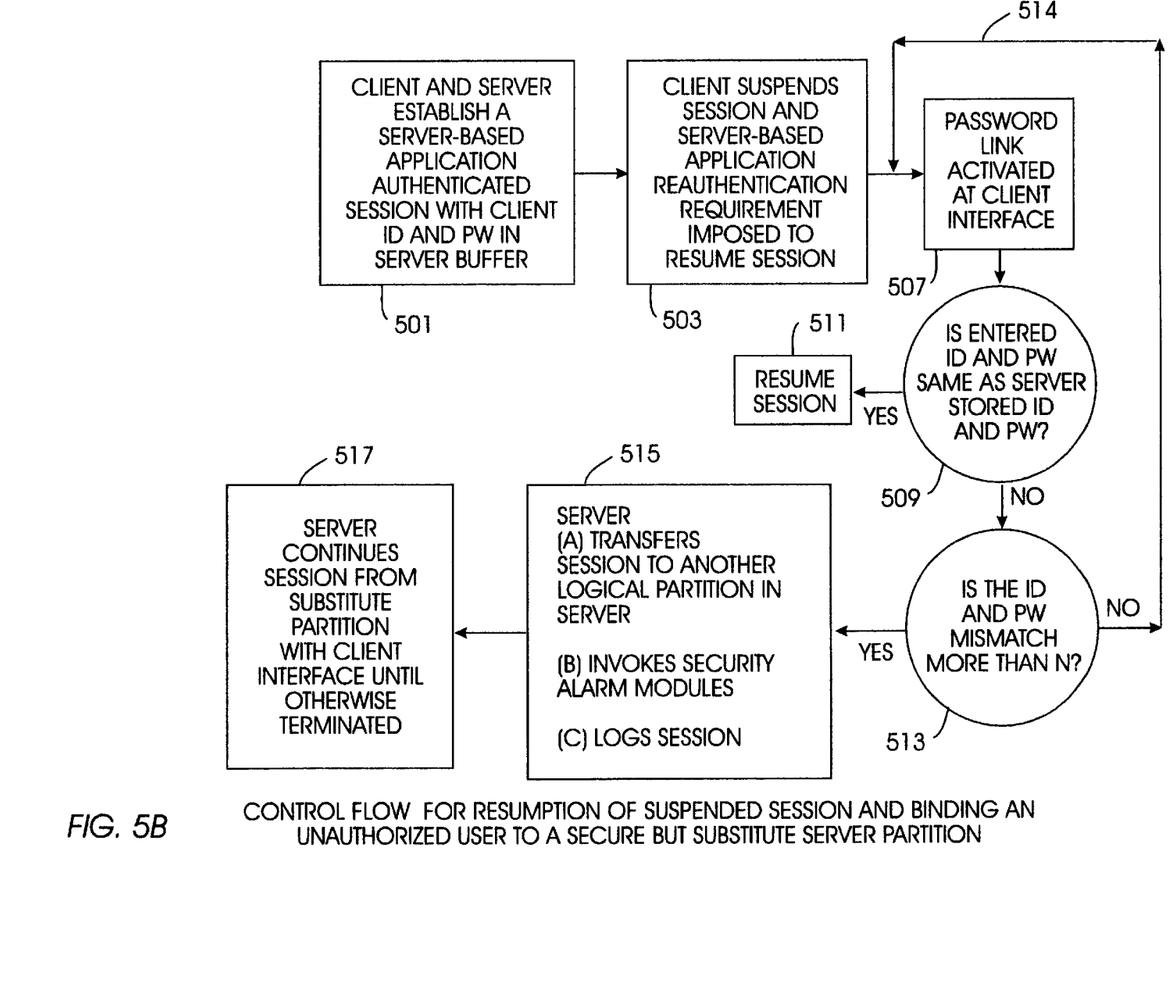
FIG. 5B shows the control flow for resumption of a suspended session and binding an unauthorized user to a secure but substitute server partition.

Referring now to FIG. 5B, there is shown the control flow for resumption of a suspended session and binding an unauthorized use to a secure but substitute server partition. This is implemented in part by first ascertaining whether the adverse user is persistent. This is the self-evident conclusion derived from the fact that repeated password entries are made, tested, and fail as set out in steps 507, 509, 513, and 514. The remedy is to actually connect the client processor to a substitute server interface and continue a conversational mode with the user as expressed in steps 515 and 517. Because the user is bound to a substitute partition or interface and access paths to the application are blocked, then complete security may be preserved.

By logging all messages and sending alerts and selected messages from the substitute interface to a security monitor, an improvement in the ability to locate those attempting system penetration has been made by creating a more extensive audit trail and holding them on the line, so to speak, than would otherwise be available. This audit trail in the substitute interface would be clear evidence of unauthorized access and would provide a significant deterrent to unauthorized access by those aware of its installation. This is because access gained on the false system is always presumed to be unauthorized, and attempts to locate or apprehend the individual that gained such access would presumably follow on an immediate basis.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A method of resuming a session in a computer network, said network having at least one client connectable to one or more servers, said client having an interface for displaying a first hypertext document with at least one link to a second hypertext document located at a server, comprising the steps of:

(a) establishing a first session with an application executing on the server using a challenge-response authentication step, said application resuming only upon reauthentication, said server maintaining a locally stored list of authorized clients and their associated security tokens;

(b) suspending the first session between the client and server at client initiation;

(c) opportunistically actuating an authorization link by a party at the client interface including sending a hypertext document reciting an authenticating token to the server application;

(d) comparing the token sent in step (c) with the locally stored token in step (a) by the application; and (e) resuming the first session between the client and the application upon the application assessing comparison equality between the authenticating token sent in step (c) with the locally stored security token.

2. The method according to claim 1, wherein said hypertext document at the client includes a markup tag requiring insertion of at least one alphanumeric sequence.

3. The method according to claim 1, wherein said markup tag includes nested HTML tags to format the hypertext document in step (c).

4. In a network connecting a client to at least one server in a client-initiated session, said client including an interface for displaying a first hypertext document embedded with a link, a method for resuming suspended sessions and entrapping unauthorized parties, comprising the steps of:

(a) establishing a first session with an application executing on the server using a challenge-response authentication step, said application resuming only upon reauthentication, said server maintaining a locally stored list of authorized clients and their associated security tokens;

(b) suspending the first session between the client and server at client initiation;

(c) opportunistically actuating an authorization link by a party at the client interface including sending a hypertext document including the link reciting an authenticating token to the server application;

(d) comparing the token sent in step (c) with the locally stored token in step (a) by the application;

(e) resuming the first session between the client and the application upon the application assessing a comparison equality between the authenticating token sent in step (b) with the locally stored security token, and in the event of noncomparison between the authenticating token with the locally stored token, communicating a retry request by the server application to the client and repeating steps (c)–(e) a predetermined number of times; and (f) upon noncomparison of the token for the predetermined number of times, binding the client to a substitute logical partition and interface within the server, and causing the substitute interface to respond to messages from the client emulating an interactive application executing upon the server.

5. The method according to claim 4, wherein step (e) further comprises the steps of:

(2) alerting a security monitor concurrently upon either ascertaining any unacceptable access pattern or binding the client to the substitute server interface;

(2) logging client communications transmitted across the substitute server interface;

(3) detecting client communications messages having predetermined control or accessing information; and (4) copying any detected messages to the security monitor.

6. The method according to claim 1 or claim 4, wherein the client and server communicate at an application ISO level under a hypertext transfer protocol (HTTP) and at a transport or session ISO level under TCP/IP protocols.

7. The method according to claim 1 or claim 4, wherein the step of establishing a first session includes the steps at the server application of generating an application control block associated with the client user identity and setting a control bit to a first Boolean-coded value, and further wherein said step of opportunistically actuating the authorization link at the client includes the steps at the server application of accessing the associated control block and ascertaining whether the control bit is set at the first Boolean value and sending a reauthentication request to the client.

8. In a network having at least one client processor connectable to one or more server processors, said client processor having an interface for displaying a first hypertext document with at least one link to a second hypertext document located at the same or other server processors, an arrangement for resuming a session in the network comprising:

means for establishing a first session with an application executing on at least a first server using a challenge-response authentication step, said application resuming only upon reauthentication, said first server maintaining a locally stored list of authorized clients and their associated security tokens;

means for suspending the first session between the client processor and the first server application at client processor initiation;

means for opportunistically actuating an authorization link by a party at the client processor interface, including sending a hypertext document reciting an authenticating token to the first server application;

means for comparing the token sent to the first server application when opportunistically actuating the link with the locally stored token when establishing the first session; and means for resuming the first session by the first server application with the client processor only upon the server application ascertaining comparison equality between the authenticating token sent to the first server application when opportunistically actuating the link with the locally stored security token.

9. In a network according to claim 8, wherein the arrangement further comprises:

means at the server, including the application responsive to the noncomparison between the authenticating token with the locally stored token, for communicating a retry request by the first server application to the client processor, and for repeating the request for reauthentication and for processing a counterpart reply from the client processor a predetermined number of times; and means at the first server, including the application responsive to the noncomparison of the tokens for the predetermined number of times, for binding the client processor to a substitute logical partition and interface within the first server, and for causing the substitute interface to response to messages from the client processor emulating an interactive application executing upon the first server.

10. An article of manufacture comprising a machine-readable memory having stored therein a plurality of processor-executable control program steps for resuming a session in a computer network, said network having at least one client connectable to one or more servers, said client having an interface for displaying a first hypertext document with at least one link to a second hypertext document located at a server, said control program steps include:

(a) a control program step for establishing a first session with an application executing on the server using a challenge-response authentication step, said application resuming only upon reauthentication, said server maintaining a locally stored list of authorized clients and their associated security tokens;

(b) a control program step for suspending the first session between the client and server application at client initiation;

(c) a control program step for opportunistically actuating an authorization link by a party at the client interface including sending a hypertext document reciting an authenticating token to the server application;

(d) a control program step for comparing by the application of the token sent in control program step (c) with the locally stored token in control program step (a); and (e) a control program step for resuming the first session by the server application with the client only upon the application ascertaining a comparison equality between the authenticating token sent in control program step (c) with the locally stored security token.

* * * * *